(12) United States Patent
Bamford et al.

(10) Patent No.: US 6,845,384 B2
(45) Date of Patent: Jan. 18, 2005

(54) ONE-PHASE COMMIT IN A SHARED-NOTHING DATABASE SYSTEM

(75) Inventors: Roger J. Bamford, Woodside, CA (US); Sashikanth Chandrasekaran, Belmont, CA (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/718,875

(22) Filed: Nov. 21, 2003

(65) Prior Publication Data

US 2004/0148289 A1 Jul. 29, 2004

Related U.S. Application Data

(63) Continuation-in-part of application No. 10/665,062, filed on Sep. 17, 2003.
(60) Provisional application No. 60/492,019, filed on Aug. 1, 2003.

(51) Int. Cl.[7] .............................................. G06F 17/30
(52) U.S. Cl. ....................................................... 707/205
(58) Field of Search .............................. 707/200, 10, 9, 707/205; 711/150; 712/203

(56) References Cited

U.S. PATENT DOCUMENTS

| | | | |
|---|---|---|---|
| 4,827,411 A | 5/1989 | Arrowood et al. | |
| 4,873,517 A | 10/1989 | Baratz et al. | |
| 4,914,571 A | 4/1990 | Baratz et al. | |
| 4,972,437 A | 11/1990 | Citron et al. | |
| 5,101,348 A | 3/1992 | Arrowood et al. | |
| 5,109,483 A | 4/1992 | Baratz et al. | |
| 5,313,051 A | 5/1994 | Brigida et al. | |
| 5,319,773 A | 6/1994 | Britton et al. | |
| 5,432,926 A | 7/1995 | Citron et al. | |
| 5,613,060 A | 3/1997 | Britton et al. | |
| 5,740,362 A | 4/1998 | Buickel et al. | |
| 5,892,754 A | 4/1999 | Kompella et al. | |
| 6,011,918 A | 1/2000 | Cohen et al. | |
| 6,253,229 B1 | 6/2001 | Nielsen et al. | |
| 6,311,265 B1 * | 10/2001 | Beckerle et al. | ............ 712/203 |
| 6,321,238 B1 * | 11/2001 | Putzolu | ...................... 707/205 |
| 6,341,340 B1 * | 1/2002 | Tsukerman et al. | ......... 711/150 |
| 6,370,619 B1 | 4/2002 | Ho et al. | |
| 6,438,714 B1 | 8/2002 | Canestaro et al. | |
| 6,480,895 B1 | 11/2002 | Gray et al. | |
| 6,567,509 B1 | 5/2003 | Gusler et al. | |
| 6,567,811 B1 | 5/2003 | Edwards et al. | |
| 6,636,248 B1 | 10/2003 | Christensen et al. | |
| 6,711,571 B2 * | 3/2004 | Putzolu | ........................ 707/9 |
| 2004/0172422 A1 * | 9/2004 | Putzolu | ...................... 707/200 |

* cited by examiner

Primary Examiner—Diane D. Mizrahi
(74) Attorney, Agent, or Firm—Hickman Palermo Truong & Becker LLP (57) ABSTRACT

Techniques are provided for handling distributed transactions in shared-nothing database systems where one or more of the nodes have access to a shared persistent storage. Rather than coordinate the distributed transaction using a two-phase commit protocol, the coordinator of the distributed transaction uses a one-phase commit protocol with those participants that have access to the transaction status information maintained by the coordinator. The transaction status information may reside, for example, in the redo log of the coordinator. In the case that the coordinator fails, those participants can determine the state of the distributed transaction based on information stored on the shared disk. In addition, the coordinator is able to determine whether it is possible to commit the distributed transaction based on information that is stored on the shared disk by the participants, without those participants entering a formal "prepared" state.

22 Claims, 4 Drawing Sheets

ONE-PHASE COMMIT IN A SHARED-NOTHING DATABASE SYSTEM

RELATED APPLICATIONS

This application claims benefit of U.S. Provisional Application Ser. No. 60/492,019 entitled "Shared Nothing on Shared Disk Hardware", filed Aug. 1, 2003, which is incorporated by reference in its entirety for all purposes as if fully set forth herein. This application also claims benefit as a Continuation-in-part of application Ser. No. 10/665,062 filed Sep. 17, 2003 the entire contents of which are hereby incorporated by reference as if fully set forth herein.

FIELD OF THE INVENTION

The present invention relates to techniques for managing data in a shared-nothing database system running on shared disk hardware.

BACKGROUND OF THE INVENTION

Multi-processing computer systems typically fall into three categories: shared everything systems, shared disk systems, and shared-nothing systems. In shared everything systems, processes on all processors have direct access to all volatile memory devices (hereinafter generally referred to as "memory") and to all non-volatile memory devices (hereinafter generally referred to as "disks") in the system. Consequently, a high degree of wiring between the various computer components is required to provide shared everything functionality. In addition, there are scalability limits to shared everything architectures.

In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node. Shared disk systems generally require less wiring than shared everything systems. Shared disk systems also adapt easily to unbalanced workload conditions because all nodes can access all data. However, shared disk systems are susceptible to coherence overhead. For example, if a first node has modified data and a second node wants to read or modify the same data, then various steps may have to be taken to ensure that the correct version of the data is provided to the second node.

In shared-nothing systems, all processors, memories and disks are grouped into nodes. In shared-nothing systems as in shared disk systems, each node may itself constitute a shared everything system or a shared disk system. Only the processes running on a particular node can directly access the memories and disks within the particular node. Of the three general types of multi-processing systems, shared-nothing systems typically require the least amount of wiring between the various system components. However, shared-nothing systems are the most susceptible to unbalanced workload conditions. For example, all of the data to be accessed during a particular task may reside on the disks of a particular node. Consequently, only processes running within that node can be used to perform the work granule, even though processes on other nodes remain idle.

Databases that run on multi-node systems typically fall into two categories: shared disk databases and shared-nothing databases.

Shared Disk Databases

A shared disk database coordinates work based on the assumption that all data managed by the database system is visible to all processing nodes that are available to the database system. Consequently, in a shared disk database, the server may assign any work to a process on any node, regardless of the location of the disk that contains the data that will be accessed during the work.

Because all nodes have access to the same data, and each node has its own private cache, numerous versions of the same data item may reside in the caches of any number of the many nodes. Unfortunately, this means that when one node requires a particular version of a particular data item, the node must coordinate with the other nodes to have the particular version of the data item shipped to the requesting node. Thus, shared disk databases are said to operate on the concept of "data shipping," where data must be shipped to the node that has been assigned to work on the data.

Such data shipping requests may result in "pings". Specifically, a ping occurs when a copy of a data item that is needed by one node resides in the cache of another node. A ping may require the data item to be written to disk, and then read from disk. Performance of the disk operations necessitated by pings can significantly reduce the performance of the database system.

Shared disk databases may be run on both shared-nothing and shared disk computer systems. To run a shared disk database on a shared-nothing computer system, software support may be added to the operating system or additional hardware may be provided to allow processes to have access to remote disks.

Shared-Nothing Databases

A shared-nothing database assumes that a process can only access data if the data is contained on a disk that belongs to the same node as the process. Consequently, if a particular node wants an operation to be performed on a data item that is owned by another node, the particular node must send a request to the other node for the other node to perform the operation. Thus, instead of shipping the data between nodes, shared-nothing databases are said to perform "function shipping".

Because any given piece of data is owned by only one node, only the one node (the "owner" of the data) will ever have a copy of the data in its cache. Consequently, there is no need for the type of cache coherency mechanism that is required in shared disk database systems. Further, shared-nothing systems do not suffer the performance penalties associated with pings, since a node that owns a data item will not be asked to save a cached version of the data item to disk so that another node could then load the data item into its cache.

Shared-nothing databases may be run on both shared disk and shared-nothing multi-processing systems. To run a shared-nothing database on a shared disk machine, a mechanism may be provided for partitioning the database, and assigning ownership of each partition to a particular node.

The fact that only the owning node may operate on a piece of data means that the workload in a shared-nothing database may become severely unbalanced. For example, in a system of ten nodes, 90% of all work requests may involve data that is owned by one of the nodes. Consequently, the one node is overworked and the computational resources of the other nodes are underutilized. To "rebalance" the workload, a shared-nothing database may be taken offline, and the data (and ownership thereof) may be redistributed among the nodes. However, this process involves moving potentially huge amounts of data, and may only temporarily solve the workload skew.

Distributed Transactions in Shared Nothing Database Systems

A distributed transaction may specify updates to data items that reside on different nodes in a shared-nothing database system. For example, a distributed transaction may specify an update to a first piece of data owned by a first shared-nothing node, and an update to a second piece of data owned by a second shared-nothing node. The nodes that own data that is involved in a distributed transaction are referred to herein as "participating" nodes or simply "participants".

To maintain data consistency, the distributed transaction must be either committed or, in the event of an error, "rolled back". When a transaction is committed, all of the changes to data specified by the transaction are made permanent. On the other hand, when a transaction is rolled back, all of the changes to data specified by the transaction that have already been made are retracted or undone, as if the changes to the data were never made. Thus, the database is left in a state that either reflects all of the changes specified in the transaction, or none of the changes specified in the transaction.

Two-Phase Commit

One approach for ensuring data consistency during distributed transactions involves processing distributed transactions using a two-phase commit protocol. Two-phase commit is described in detail, for example, in U.S. Pat. No. 6,493,726, entitled "Performing 2-Phase Commit With Delayed Forget". In general, two-phase commit requires that the transaction first be "prepared", and then committed. Prior to the prepared phase, the changes specified by the transaction are made at each of the participating shared-nothing nodes. When a participating node completes all requested operations, the participating node forces the changes, and a "prepare" record, to persistent storage. The participant then reports to the coordinator that the participant is in the "prepared" state. If all of the participants successfully enter the prepared state, then the coordinator forces a commit record to persistent storage. On the other hand, if any errors occur prior to the prepared state, indicating that at least one of the participating nodes could not make the changes specified by the transaction, then all of the changes at each of the participating nodes are retracted, restoring each participating database system to its state prior to the changes.

Figure 1:
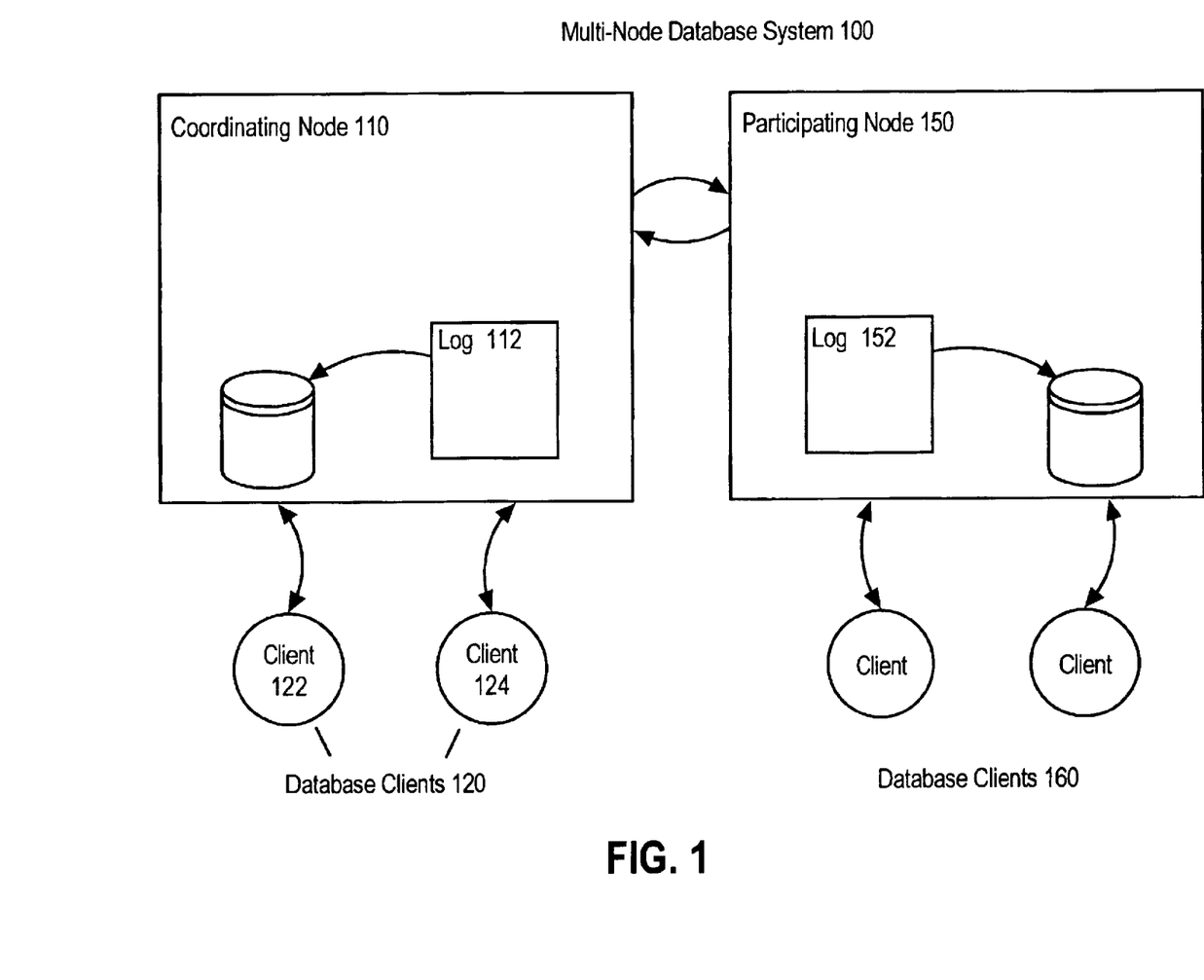
FIG. 1 is a block diagram a multi-node database system.

FIG. 1 shows a multi-node shared-nothing database system used to illustrate in more detail the costs associated with a conventional approach for performing a two-phase commit. Multi-node database system 100 includes a coordinating node 110 and a participating node 150. Coordinating node 110 receives requests for data from database clients 120, which include client 122 and client 124. Such requests may be in the form of, for example, SQL statements.

Coordinating node 110 includes a log, such as log 112. The log 112 is used to record modifications made to the database system, and other events affecting the status of those modifications, such as commits. Log 112 contains a variety of log records. When these log records are first created, initially they are stored in volatile memory, and are soon stored permanently to non-volatile storage (e.g. a non-volatile storage device such as a disk). Once log records are written to non-volatile storage, the modifications and other events specified by the log records are referred to as being "persistent". The modifications and events are "persistent" because the permanently stored log records may be used, in the event of a system failure, after the failure to replay the modifications and events to restore the database to its pre-failure state.

Figure 2:
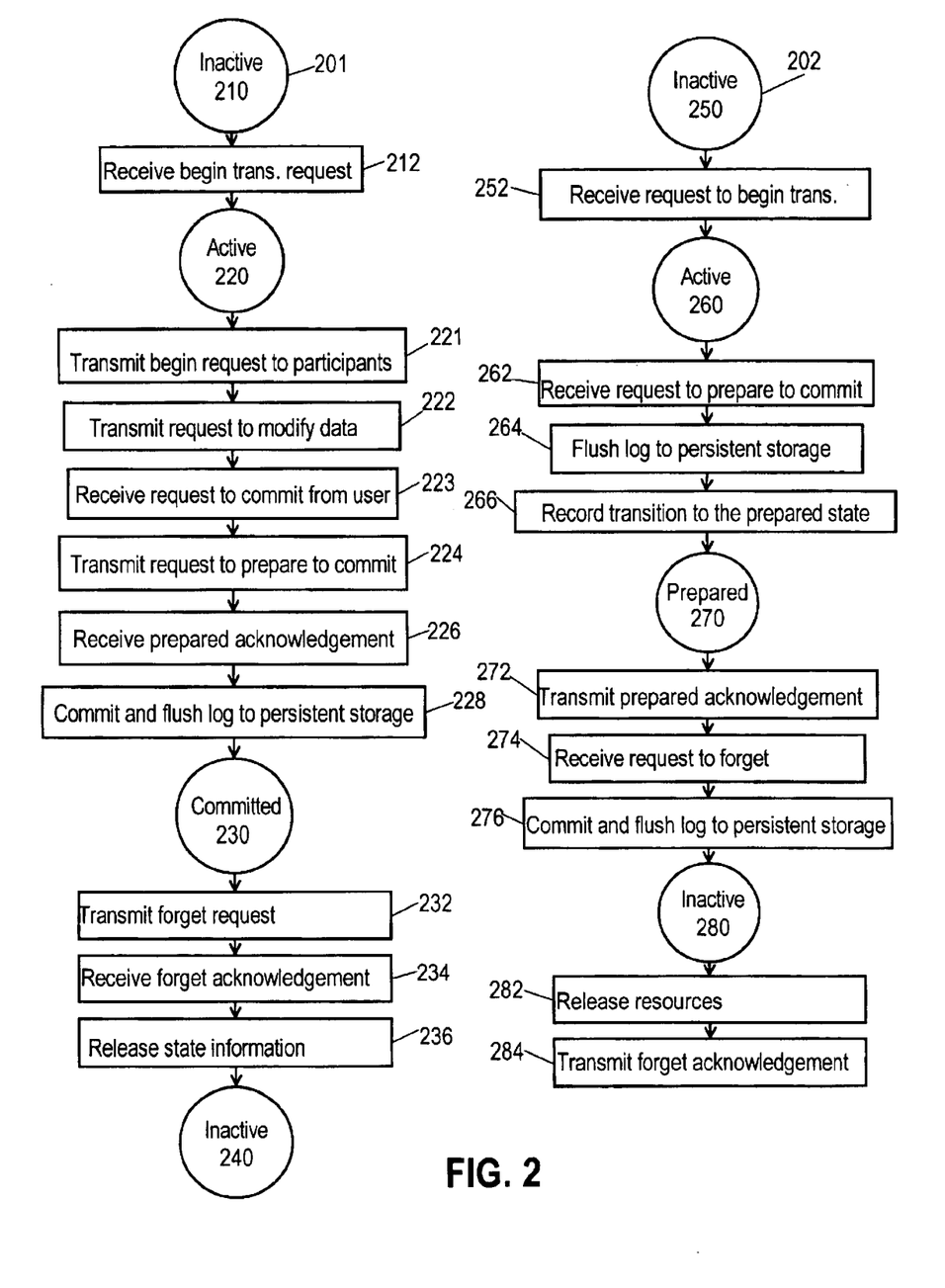
FIG. 2 is a flowchart illustrating the steps involved in a convention two-phase commit protocol.

FIG. 2 is a flowchart showing the interaction between a coordinator and a participant according to a conventional approach for performing a two-phase commit. The transaction states are illustrated using multi-node database system 100 as an example. Transaction states 201 are the transaction states that a transaction goes through within a coordinating database system (i.e. coordinating node 110), and transaction states 202 are the transaction states a transaction goes through within a participating database system (i.e. participating node 150).

Referring to FIG. 2, inactive states 210, 240, 250, 290 represent the inactive state of a transaction. In the inactive state, there are no database operations specified by the transaction that require any further action (e.g. commit, undo, locking or unlocking of resources needed to perform the operations, such as data blocks). A transaction is initially in the inactive state (i.e. inactive state 210 and 250), and upon completion transitions back to the inactive state (i.e. inactive states 240 and 290).

A transaction transitions from the inactive state to the active state when a database system receives a "begin transaction" request. For example, client 122 (FIG. 1) may issue a BEGIN TRANSACTION request to coordinating node 110. Alternatively, the "begin transaction" command may be implicit. For example, a database server may begin an active transaction upon receiving a statement that specifies an operation or change. At step 212, coordinating node 110 receives the begin transaction request and enters active state 220. Next, coordinating node 110 receives a command to modify data on participating node 150. In response, at step 221, coordinating node 110 transmits a request to participating node 150 to begin a transaction. At step 222, coordinating node 110 transmits one or more requests to participating node 150 to modify data on participating node 150.

At step 252, participating node 150 receives the request to begin a transaction. Relative to participating node 150, the transaction enters the active state 260. Afterwards, participating node 150 receives the request to modify data.

Once a transaction within a database system enters the active state, the database system may receive any number of requests to modify data as part of the transaction. For example, client 122 may issue requests to coordinating node 110 to modify data on both coordinating node 110 and participating node 150. In response to receiving the requests to modify data on participating node 150, coordinating node 110 transmits requests to modify data on participating node 150 to participating node 150.

At step 223, the coordinating database system receives a request from client 122 to commit the transaction. In response, at step 224, coordinating node 110 transmits a prepare request to participating node 150. At step 262, participating node 150 receives the request.

At step 264, participating node 150 flushes log 152 (FIG. 1) to non-volatile storage. "Flushing the log" refers to causing the log records of the log that are currently only stored in volatile memory to be stored to non-volatile storage. Thus, flushing the log renders the modifications for participating node 150 persistent. When the modifications are rendered persistent, participating node 150 is able to guarantee that it can commit its portion of the transaction. Consequently, after step 264, the transaction enters the prepared state. At step 266, participating node 150 records the transition to the prepared state in log 152 (i.e. stores on disk a log record that records the fact the prepared state has been reached).

At step 272, participating node 150 transmits a prepared acknowledgment to the coordinating node 110. A prepared acknowledgment is a message sent by a participating database system that indicates whether or not the participating database system is prepared to commit the transaction. A participating database system is prepared to commit when the transaction is in the prepared state on the participating database system. At step 226, coordinating node 110 receives the prepared acknowledgment.

At step 228, coordinating node 110 commits and flushes the log 112. Specifically, coordinating node 110 creates a log record in log 112 to record the commit. When coordinating node 110 flushes the log, it renders the commit persistent. When a commit is persistent, the transaction is in the committed state. Thus, after flushing the log, coordinating node 110 transitions to committed state 230.

After the transaction reaches the committed state, at step 232, coordinating node 110 transmits to participating coordinating node 110 a forget request. Next, participating node 150 forgets the transaction. A forget request is a message sent to a participating database system requesting that the participating database system performing forget processing. "Forget processing" generally refers to the additional operations needed to transition a transaction from the prepared or committed state to the inactive state (e.g. commit the transaction, release resources, and render the transaction inactive).

At step 274, participating node 150 receives the forget request. At step 276, participating database system commits (including creating a log record to record the commit), and then flushes log 152. At this stage, the transaction enters the inactive state on participating node 150. At step 282, participating node 150 releases any remaining locks on resources that were locked by participating node 150 on behalf of the transaction. At step 284, participating node 150 transmits a forget acknowledgement to coordinating node 110. A forget acknowledgement is a message sent by a participating node acknowledging that forget processing is completed on the participating node.

At step 234, coordinating node 110 receives the message acknowledging the completion of forget processing. At step 236, coordinating node 110 can delete state information maintained by the coordinator on behalf of the transaction. Such state information may include, for example, a list of the participants in the distributed transaction. At this stage, the transaction enters the inactive state on coordinating node 110.

The per transaction cost of the two-phase commit can be measured by the number of transmitted messages and log flushes that are attributable to performing the two-phase commit. Because four messages are attributable to the two-phase commit (i.e. step 221, step 232, step 272, and step 284), the per transaction cost in terms of messages is 4N, where N equals the number of participating nodes. Because one log flush for the coordinating node (i.e. step 228) and two log flushes for each participating node are attributable to the two-phase commit, the cost in terms of log flushes is 2N+1, where N is the number of participating nodes.

Based on the foregoing, it is clearly desirable to provide techniques to reduce the number messages, handshaking, and log flushes required to complete a transaction that involves multiple shared-nothing nodes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Various techniques are described hereafter for improving the performance of a shared-nothing database system that includes a shared disk storage system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Various techniques are described hereafter for improving the performance of a shared-nothing database system in which at least two of the nodes that are running the shared-nothing database system have shared access to a disk. As dictated by the shared-nothing architecture of the database system, each piece of data is still owned by only one node at any given time. However, the fact that at least some of the nodes that are running the shared-nothing database system have shared access to a disk is exploited to more efficiently perform distributed transactions. Specifically, rather than ensure consistency of distributed transactions through a two-phase commit protocol, a one-phase commit protocol is used by those participants that have access to the shared disk containing the redo log of the coordinator process.

Redo Logs

When, as part of a transaction, a database server updates a data item in volatile memory, the database server generates a redo record that contains information about the update. Before the transaction commits, the redo record of the update is typically stored in a redo log on disk. Storing the redo record on disk before the transaction commits ensures that the database will be able to reflect the update even if the database crashes before the updated data item is itself written to disk. Redo records and redo logs are described, for example, in U.S. Pat. No. 5,903,898, entitled "Method And Apparatus For User Selectable Logging".

The redo records generated by a node are typically stored in a redo log that is private to that node. Thus, a shared-nothing database system with three nodes will typically have three redo logs, each of which corresponds to one of the three nodes. The redo log that is associated with a shared-nothing node may only contain redo for the changes made by that node. However, when the redo log is stored on a shared disk to which the other nodes have access, it is possible for the other nodes to inspect the contents of the redo log.

As shall be described in greater detail hereafter, techniques are provided to allow certain distributed transactions, or portions of distributed transactions, to be performed using a one-phase commit protocol by taking advantage of the ability of shared-nothing nodes to inspect the information maintained by other shared-nothing nodes. For example, techniques are described that take advantage of the fact that some participants in a distributed transaction may be able to read the information, maintained by the coordinator process of the distributed transaction, that indicates the state of the distributed transaction. Such state information may be maintained on a shared disk, for example, in the redo logs of the coordinator process. Alternatively, a separate structure, such as table, a set or blocks, or some persistent indexed structure may be used to store the distributed transaction state information. As shall be explained hereafter, during commit of the distributed transaction, the coordinator forces the change to the transaction state to the shared disk so that the state information may be inspected by other participants to determine the outcome, in case the coordinator dies before sending messages to the other participants about the commit.

Inside Participants and Outside Participants

According to one embodiment, the protocol used in the interaction between the coordinator node and a participant in a distributed transaction within a shared-nothing database system hinges on whether the participant is able to inspect the distributed transaction state information maintained by the coordinator. The participants that are able to inspect the distributed transaction state information are referred to herein as "inside participants", while the participants that are not able to inspect the distributed transaction state information are referred to as "outside participants".

Two-Phase Commit for Outside Participants

According to one embodiment, outside participants in a distributed transaction in a shared-nothing database system interact with the coordinator process according to a two-phase commit protocol. For example, an outside participant may transition through the states and steps illustrated in FIG. 2. Specifically, the outside participant first receives from the coordinator a request to begin a transaction as part of the larger distributed transaction. The outside participant then initiates a transaction and performs the requested operations as part of the transaction.

If the changes made by the distributed transaction are intended to be permanent, then the outside participant will eventually receive a request to "prepare". In response to the prepare request, the outside participant flushes the redo records to disk, flushes a "prepared" record to disk, and sends a prepared acknowledgement back to the coordinator node.

Assuming that all participants are able to prepare successfully, the outside participant will receive a request to forget. In response to the request to forget, the outside participant forces to disk a commit record. The participant then sends a forget acknowledgement to the coordinator node.

One-Phase Commit for Inside Participants

In one embodiment, an inside participant does not use the two-phase commit protocol during the distributed transaction. Specifically, after successfully performing their tasks associated with the distributed transaction, the inside participants do not have to log a prepare record indicating that they are prepared. Rather, after performing the requested work and flushing any changes made thereby to persistent storage, an inside participant merely waits for a commit request from the coordinator. When the commit request arrives, the inside participant commits the changes and sends a commit acknowledge message back to the coordinator.

Figure 3:
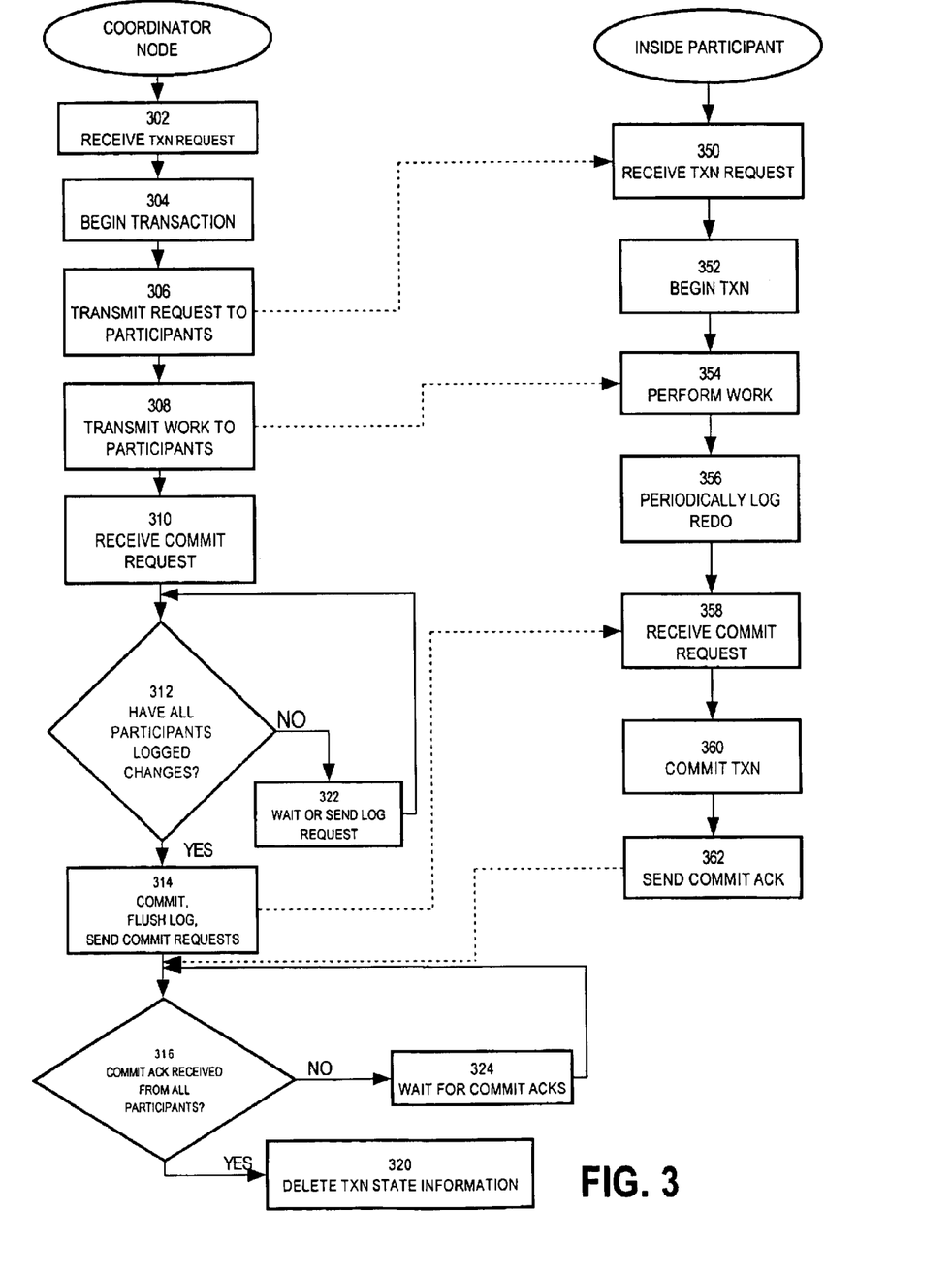
FIG. 3 is a flowchart illustrating the interaction between a coordinator and an inside participant, according to an embodiment of the invention.

Referring to FIG. 3, it is a flowchart that illustrates the interaction between a coordinator and an inside participant during a distributed transaction, according to an embodiment of the invention. For the purpose of illustration, it shall be assumed that the coordinator node and the inside participant are two shared-nothing nodes of a shared-nothing database, and that the distributed transaction requires one or more operations that involve data owned by the inside participant.

At step 302, the coordinator receives a request to begin the distributed transaction, and at step 304, the coordinator begins the distributed transaction. At step 306 the coordinator sends a request to the inside participant to begin a child transaction to perform operations that are part of the distributed transaction.

At step 350, the inside participant receives the request to begin a child transaction, and at step 352 the inside participant starts the child transaction. At step 308 the coordinator sends a request for the inside participant to perform work, and at step 354 the inside participant receives the request and performs the work. While the inside participant performs the work, the inside participant generates redo records that reflect the changes being made by the inside participant. Such redo records may be periodically stored on disk, as indicated at step 356. Alternatively, the redo records may be retained in volatile memory until some flush-triggering conditions are satisfied. Such flush-triggering conditions may include, for example, the need to free up volatile memory for other uses, or the receipt of a flush request.

At step 310, the coordinator node receives a commit request. In response to the commit request, the coordinator determines whether all of the participants have stored to disk the redo for all of the changes that were performed as part of the distributed transaction. Various techniques may be used for the coordinator to make this determination. Examples of such techniques shall be given in greater detail hereafter.

If all of the participants have stored to disk the redo for all of the changes that were performed as part of the distributed transaction, then control passes to step 314. Otherwise, control passes to step 322. At step 322, the coordinator node waits until all participants have logged their changes to disk. To expedite the completion of the transaction, the coordinator may optionally send a flush request to those participants that have not yet logged all of their changes to disk. In response to such a request, the participants flush to disk all of the redo associated with changes made as part of the distributed transaction.

At step 314, the coordinator flushes to disk any redo, for the transaction, that has not yet been flushed to disk. The coordinator also forces to disk a commit record to indicate that the distributed transaction has committed. The coordinator then sends a commit request to the participants, and waits (steps 316 and 324) for the participants to acknowledge that they have committed their changes. It should be noted that, while the coordinator still sends commit requests to the inside participants, the commit requests may be sent after the distributed transaction is actually committed. Thus, the transmission of such messages, and the receipt of subsequent acknowledgements, are not on the "critical path" of the distributed transaction.

At step 358, the inside participant receives the commit request, and at step 360 commits the child transaction that included the work for the distributed transaction. After committing the child transaction, the inside participant sends a commit acknowledge message back to the coordinator (step 362).

The coordinator persistently retains data that indicates the state of the distributed transaction until the coordinator receives commit acknowledge messages from all of the participants. Once the coordinator receives commit acknowledge messages from all of the participants, the coordinator process no long needs to retain the state information about the distributed transaction (step 320).

Determining Whether Participant Redo has Been Written to Disk

As mentioned above, when a node makes changes, the node generates redo records that correspond to the changes. The changes performed by each node are typically assigned a sequence number by the node. Such sequence numbers are referred to herein as "log-sequence-numbers".

According to one embodiment, when an inside participant performs work that is part of a distributed transaction, the inside participant communicates to the coordinator of the distributed transaction the highest log-sequence-number that corresponds to work done by the inside participant for the transaction. For example, assume that an inside participant performs three changes as part of a distributed transaction. Assume further that the redo records for those changes are assigned the log-sequence-numbers 5, 7 and 9. In this example, upon completion of the changes, the inside participant would communicate the log-sequence-number of 9 to the coordinator.

According to one embodiment, the coordinator uses the log-sequence numbers received from the inside participants to determine whether the inside participants have logged to disk all of the changes made as part of the distributed transaction. For example, assume that the highest log-sequence-number that has been communicated to the coordinator by a particular inside participant is 9. Under these circumstances, if the inside participant's persistent log includes all redo records associated with log-sequence-numbers 9 and less, then the coordinator knows that the inside participant has logged to disk the changes associated with the distributed transaction.

A variety of techniques may be used for the coordinator to determine which redo records have been flushed to disk by the inside participants. For example, the redo log of the inside participants may be on a shared disk directly accessible to the coordinator. The coordinator may therefore simply inspect the inside participant's redo log and/or any metadata maintained for the redo log, to determine whether the necessary redo information has been stored on disk. Alternatively, the various nodes in the shared-nothing database system may communicate to each other the current boundary ("checkpoint") of their respective redo logs (where all redo at or below the checkpoint have been logged to disk). Such communications may be made in response to requests for the information, or may be proactively communicated on a periodic basis.

Piggybacked Messages

It is common for many messages to be traveling back and forth between the shared-nothing nodes of a shared-nothing database system. According to one embodiment, some or all of the information communicated between a coordinator node and an inside participant are communicated by "piggybacking" the information on messages that are otherwise being sent between the nodes.

For example, at step 322, the coordinator may send a "force redo" message to an inside participant by piggybacking the message on another message that is being sent to the node of the inside participant. Similarly, inside participants can send the highest log-sequence-numbers and commit acknowledge messages to the coordinator process by piggybacking the information on messages that are otherwise being sent to the coordinator.

Recovery of Crashed Participants

As mentioned above, the coordinator commits the distributed transaction (step 314) after the coordinator determines that all of the participants have logged the redo associated with the changes made as part of the distributed transaction. It is possible for a participant in the distributed transaction to crash, either before or after writing the necessary redo to disk. Under these circumstances, the recovery of the crashed participant will involve determining whether to commit or roll back the changes that were made as part of the distributed transaction.

If the crashed participant was an outside participant, then the participant's own redo log will have a prepare record associated with the distributed transaction if the outside participant prepared the changes prior to the crash. Upon detecting the prepare record, the recovery process will know to not automatically roll back the changes associated with the distributed transaction. On the other hand, if the redo log of an outside participant does not have a prepare record, then the recovery process automatically rolls back the changes.

If the crashed participant was an inside participant, then the participant's own redo log will not have a prepare record, even if the crashed participant had logged to disk enough redo information prior to the crash. However, rather than automatically roll back the changes associated with the distributed transaction, the recovery process asks the coordinator node whether the distributed transaction has been committed.

If the coordinator is alive and responds by indicating that the distributed transaction committed, then the changes made by the crashed node are made permanent as part of the recovery of the crashed node.

If the coordinator node is alive and responds by indicating that the distributed transaction was rolled back, then the changes made by the crashed node are rolled back as part of the recovery of the crashed node.

If the coordinator node had crashed, and another node is recovering the coordinator node, then the process that is recovering the coordinator node may be able to provide the necessary information to the recovery process of the crashed participant. However, if the coordinator node had crashed, and no recovery process is available to provide the status of the distributed transaction, then the recovery process for the inside participant can obtain the necessary information by directly accessing the distributed transaction state information maintained by the coordinator node.

Specifically, in an embodiment where the inside participants have access to the redo log of the coordinator, the recovery process for the crashed inside participant may inspect the redo log of the coordinator to see if there is a commit record for the distributed transaction. If the redo log of the coordinator process includes a commit record for the distributed transaction, then the recovery process commits the changes that were made by the crashed participant. On the other hand, if the redo log of the coordinator does not contain a commit record for the distributed transaction, then the recovery process rolls back the changes made by the crashed participant.

Crashed Coordinator

It is possible for the coordinator to crash before sending commit requests to the participants in the distributed transaction. Under these circumstances, the outside participants will know the status of the distributed transaction based on the communications they had received from the coordinator prior to the crash. Specifically, an outside participant will know whether it had received a request to prepare and/or a request to forget.

Inside participants, on the other hand, may have to access the shared disk to inspect the transaction state information that was written to disk by the coordinator prior to the crash. According to one embodiment, when an inside participant needs to know the transaction state of the coordinator, the inside participant requests the state information from the coordinator node or, if the coordinator node is being recovered, from the recovery process that is recovering the coordinator node. If the coordinator node is crashed and is not yet being recovered, then the inside participant retrieves the distributed transaction state information that was maintained by the coordinator. For example, in one embodiment, the inside participant obtains this information by inspecting the coordinator's redo logs. If the transaction status indicates that the coordinator had committed the distributed transaction, then the inside participant commits the changes that the inside participant had made as part of the distributed transaction. If the coordinator process had not committed the distributed transaction at the time of the crash, then the inside participant rolls back the changes that the inside participant made as part of the distributed transaction.

To ensure that all of the inside participants eventually learn final state of the distributed transaction, the coordinator node prevents the transaction state information of the distributed transaction from being deleted or overwritten until all subordinates acknowledge that their corresponding child transactions have been committed or aborted. Thus, even if an inside participant crashes after the distributed transaction is committed, and before receiving the commit request, the inside participant will eventually learn that that distributed transaction was committed, and will therefore eventually commit its corresponding child transaction.

Hardware Overview

Figure 4:
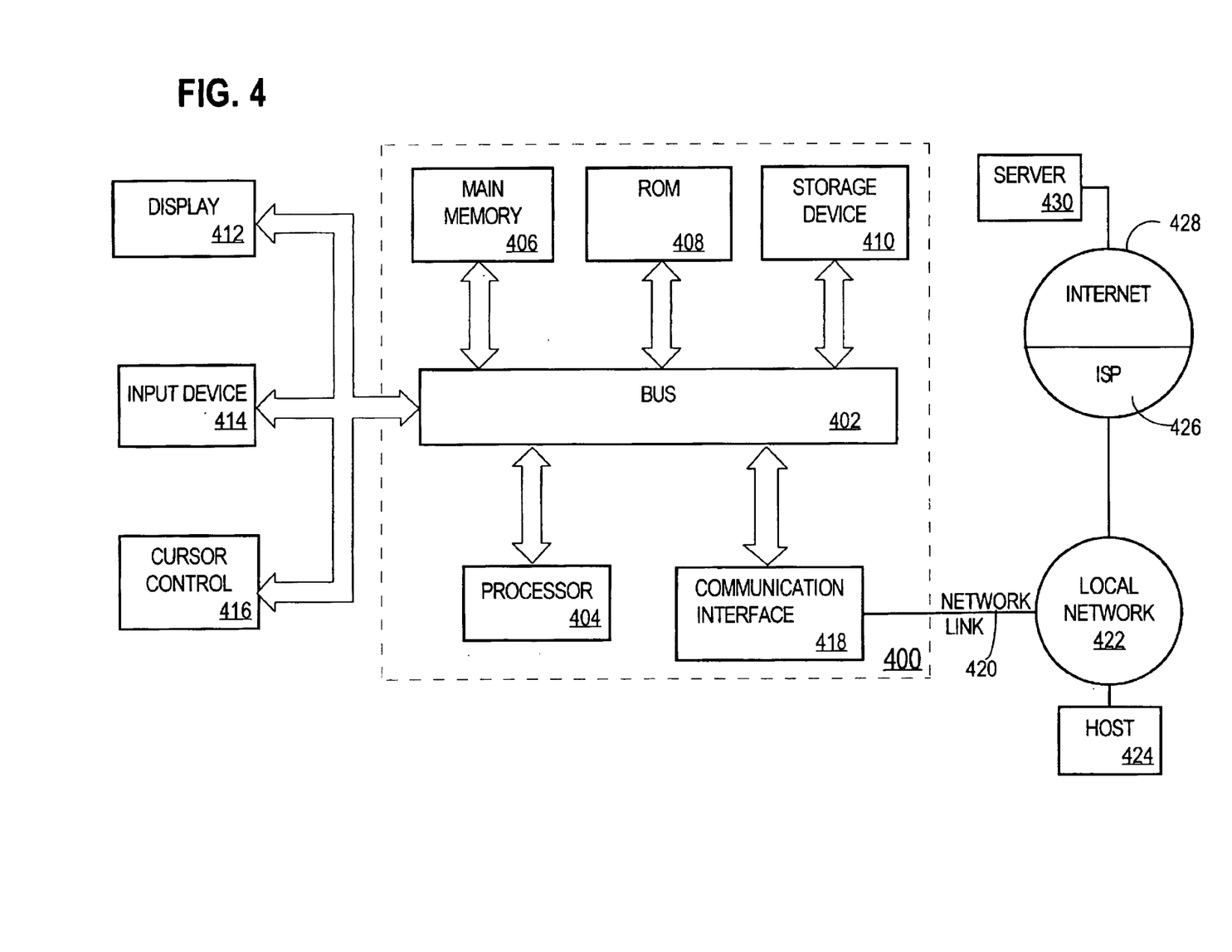
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for performing a distributed transaction in a shared-nothing database system, the method comprising:

on a first shared-nothing node of said shared-nothing database system, causing a coordinator that is coordinating the distributed transaction to store information that indicates status of said distributed transaction on a persistent storage device;

wherein the persistent storage device is accessible to a participant that is to perform one or more operations as part of said distributed transaction;

wherein the participant resides on a second shared-nothing node of said shared-nothing database system; and on the second shared-nothing node of said shared-nothing database system, causing the participant to determine the status of said distributed transaction by reading the information from the persistent storage device.

2. The method of claim 1 wherein:

the participant is a first participant of a plurality of participants in said distributed transaction;

the plurality of participants includes a second participant that does not have access to said persistent storage device; and the method further comprises the step of the coordinator interacting with the second participant according to a two-phase commit protocol.

3. A computer-readable medium carrying one or more sequences of instructions which, when executed by one or more processors, causes the one or more processors to perform the method recited in claim 2.

4. The method of claim 1 further comprising the steps of:

the coordinator committing the distributed transaction;

after the coordinator commits the distributed transaction, the coordinator sending a commit message to the participant; and preventing the information that indicates the status of the distributed transaction from being overwritten or deleted until a set of conditions is satisfied, wherein one condition in said set of conditions is that the coordinator receives a commit acknowledge message from said participant.

5. A computer-readable medium carrying one or more sequences of instructions which, when executed by one or more processors, causes the one or more processors to perform the method recited in claim 4.

6. The method of claim 1 further comprising the steps of:

the participant sending a first piece of information to the coordinator, wherein the first piece of information is associated with work performed by said participant as part of said distributed transaction; and the coordinator performing a comparison between the first piece of information and information associated with a redo log of said second shared-nothing node; and the coordinator determining whether to commit the transaction based, at least in part, on said comparison.

7. The method of claim 6 wherein piece of information includes a log-sequence-number of the latest change made by the participant as part of the distributed transaction.

8. The method of claim 7 wherein the step of sending includes the steps of:

the participant identifying a message that is being sent to said first shared-nothing node for a purpose unrelated to the distributed transaction; and piggybacking the log-sequence number on said message.

9. A computer-readable medium carrying one or more sequences of instructions which, when executed by one or more processors, causes the one or more processors to perform the method recited in claim 8.

10. A computer-readable medium carrying one or more sequences of instructions which, when executed by one or more processors, causes the one or more processors to perform the method recited in claim 7.

11. A computer-readable medium carrying one or more sequences of instructions which, when executed by one or more processors, causes the one or more processors to perform the method recited in claim 6.

12. A computer-readable medium carrying one or more sequences of instructions which, when executed by one or more processors, causes the one or more processors to perform the method recited in claim 1.

13. A method for performing a distributed transaction in a shared-nothing database system, the method comprising:

assigning a participant to perform one or more operations as part of said distributed transaction;

wherein the participant resides on a first shared-nothing node of said shared-nothing system;

causing said participant to store, on a persistent storage device, status information that indicates changes made by the participant during performance of said one or more operations;

wherein the persistent storage device is accessible to a coordinator that is responsible for coordinating said distributed transaction;

wherein the coordinator resides on a second shared-nothing node of said shared-nothing database system;

on said second shared-nothing node of said shared-nothing database system, causing said coordinator to determine, based on the status information on said persistent storage device, whether the participant has written to persistent storage changes produced by performance of the one or more operations; and the coordinator process determining whether the distributed transaction can be committed based, at least in part, on whether the participant has written to persistent storage changes produced by performance of the one or more operations.

14. The method of claim 13 wherein:

the step of causing said participant to store, on a persistent storage device, status information that indicates changes made by the participant during performance of said one or more operations includes causing said participant to store redo information in a redo log on said persistent storage device; and the step of causing said coordinator to determine, based on the status information on said persistent storage device, whether the participant has written to persistent storage changes produced by performance of the one or more operations includes inspecting the redo log of the participant to determine whether the redo information for said changes have been written to said persistent storage.

15. The method of claim 13 wherein:

the participant is a first participant of a plurality of participants in said distributed transaction;

the plurality of participants includes a second participant that stores status information on a second persistent storage device that is not accessible by said coordinator; and the method further comprises the step of the coordinator interacting with the second participant according to a two-phase commit protocol.

16. A computer-readable medium carrying one or more sequences of instructions which, when executed by one or more processors, causes the one or more processors to perform the method recited in claim 14.

17. A computer-readable medium carrying one or more sequences of instructions which, when executed by one or more processors, causes the one or more processors to perform the method recited in claim 15.

18. The method of claim 13 wherein:

the information on said persistent storage device indicates that the participant has not written to persistent storage changes produced by performance of the one or more operations; and the method further comprises the coordinator sending a force redo message to the participant to cause the participant to write to persistent storage the changes produced by performance of the one or more operations.

19. The method of claim 18 wherein the step of sending a force redo message includes the steps of:

identifying a message that is being sent to said first shared-nothing node for a purpose unrelated to the distributed transaction; and piggybacking the force redo message on said message.

20. A computer-readable medium carrying one or more sequences of instructions which, when executed by one or more processors, causes the one or more processors to perform the method recited in claim 19.

21. A computer-readable medium carrying one or more sequences of instructions which, when executed by one or more processors, causes the one or more processors to perform the method recited in claim 18.

22. A computer-readable medium carrying one or more sequences of instructions which, when executed by one or more processors, causes the one or more processors to perform the method recited in claim 13.

* * * * *